May 15, 1945.　　　G. C. NELMS ET AL　　　2,375,866
BATTERY CHARGING RACK
Filed May 16, 1940　　　3 Sheets-Sheet 1
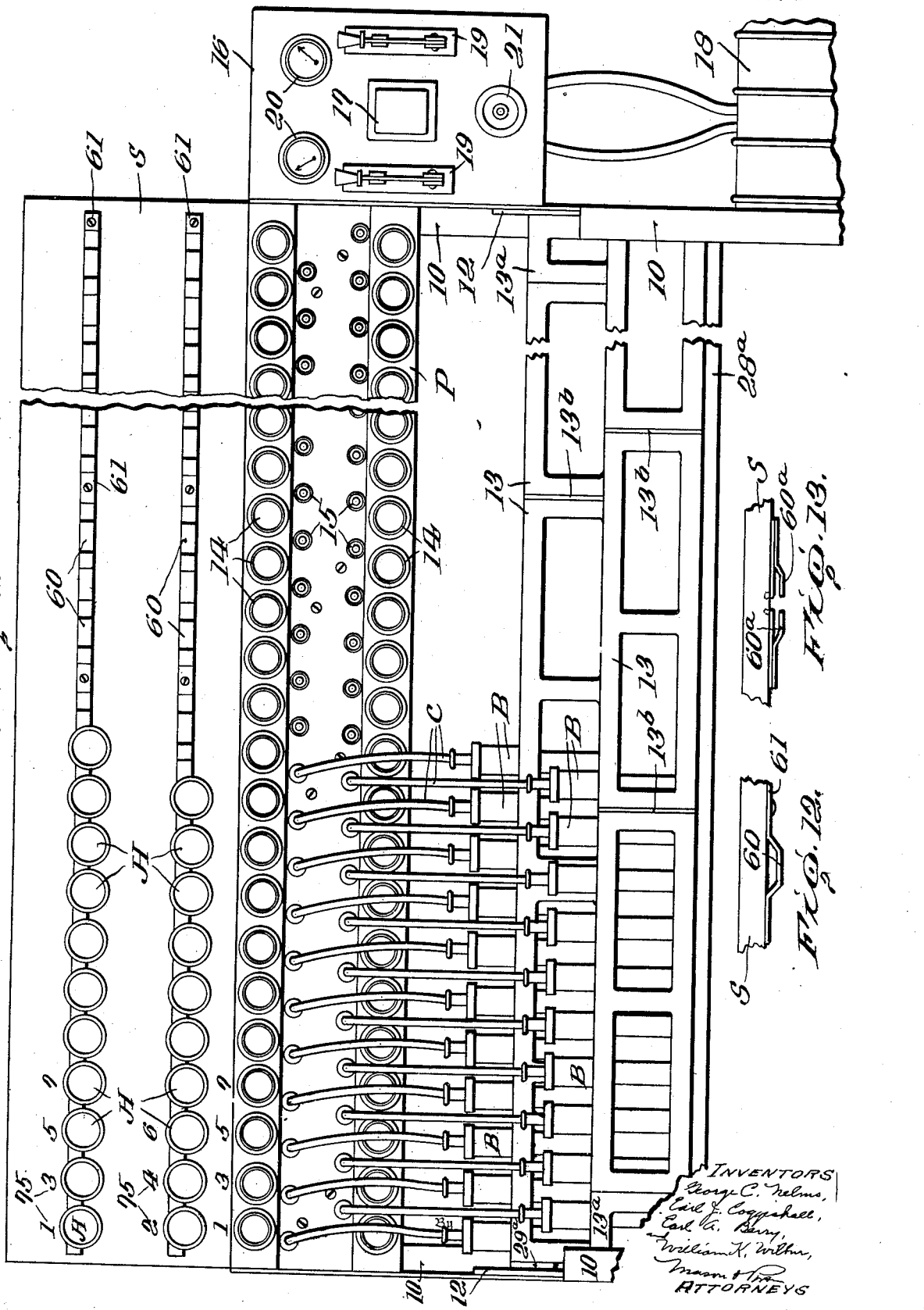

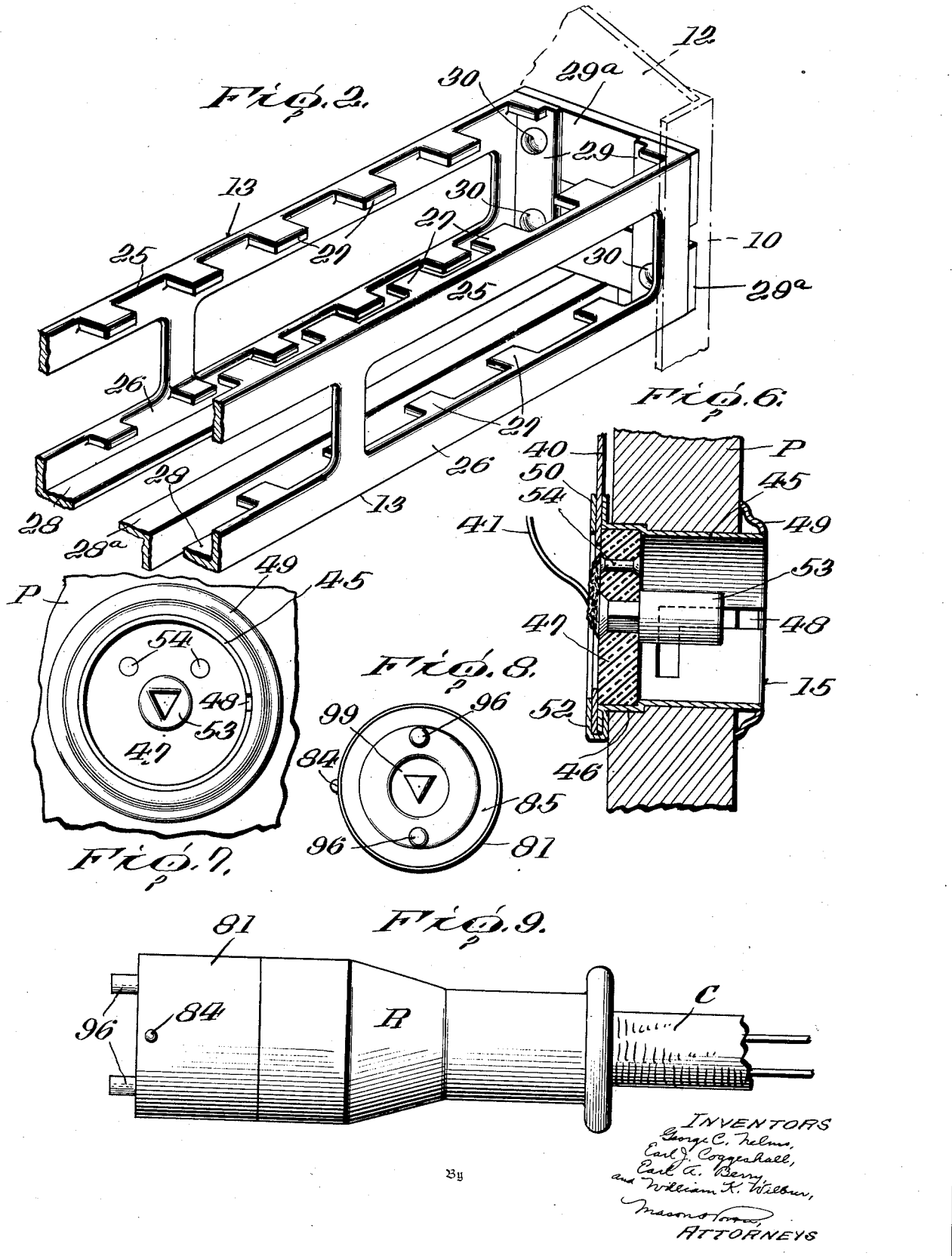

May 15, 1945.  G. C. NELMS ET AL  2,375,866
BATTERY CHARGING RACK
Filed May 16, 1940   3 Sheets-Sheet 3
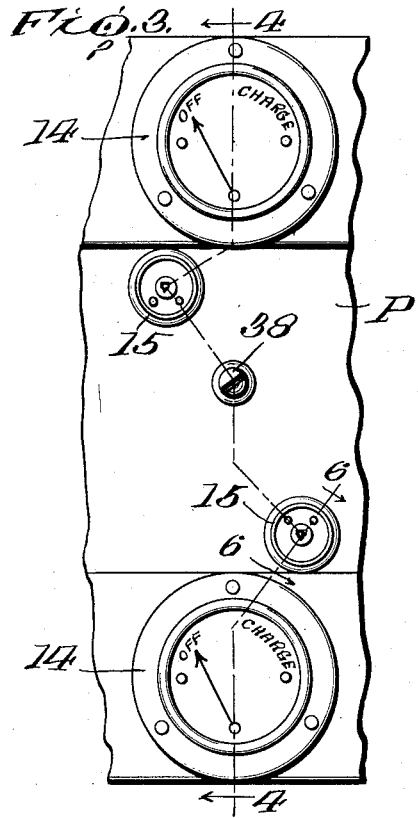
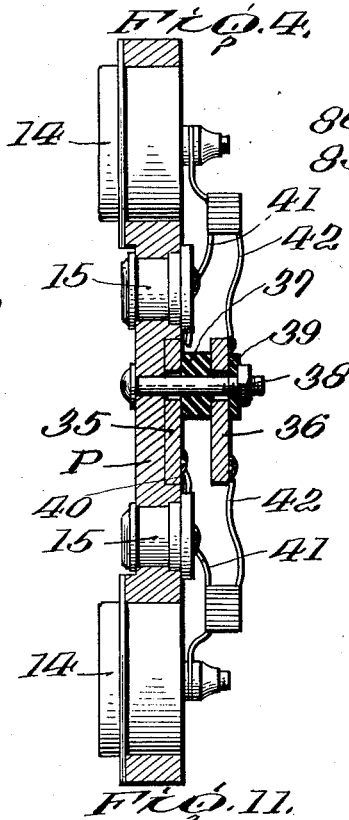
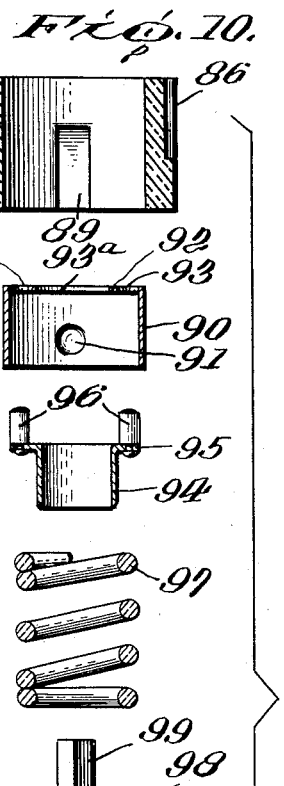
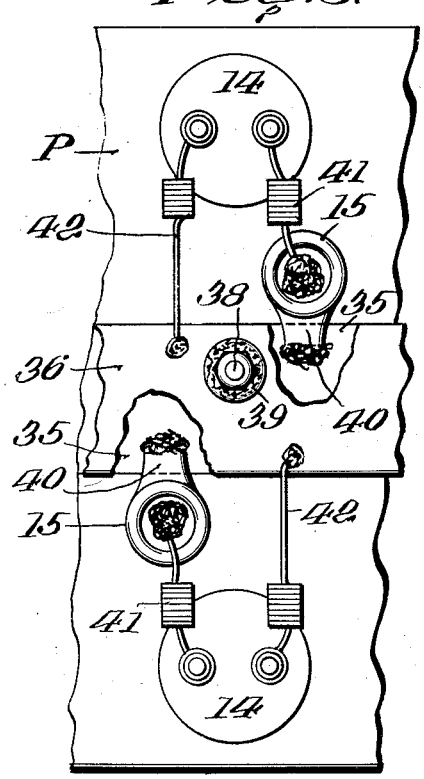
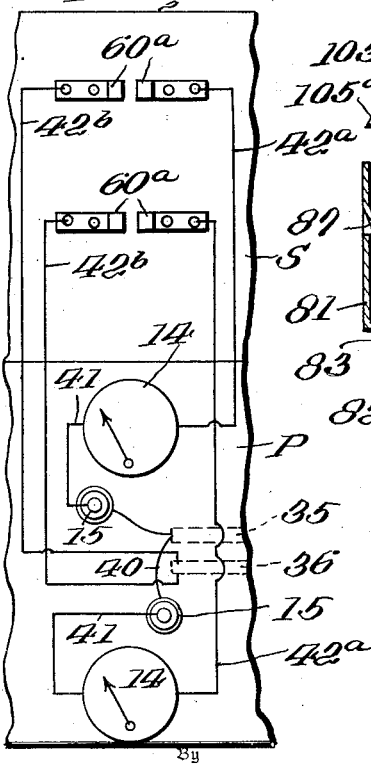
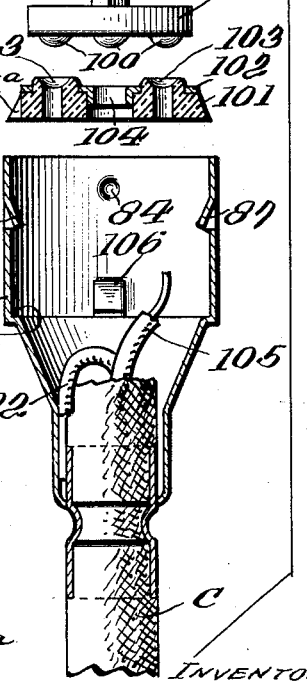

Patented May 15, 1945

2,375,866

UNITED STATES PATENT OFFICE 2,375,866

BATTERY CHARGING RACK

George C. Nelms, Pittsburgh, Earl J. Coggeshall, Turtle Creek, and Earl A. Berry, McDonald, Pa., and William K. Wilbur, Bluefield, W. Va., assignors to Portable Products Corporation, a corporation of Pennsylvania Application May 16, 1940, Serial No. 335,598

7 Claims. (Cl. 136—173)

This invention relates to improvements in charging racks for storage batteries of the type employed in mine lamps, and like devices.

One of the features of the invention is the provision of a simple structure for receiving a plurality of such batteries and including means for permitting individual connection of the batteries to a charging circuit.

Another feature of the invention is the provision of supporting means for batteries to be charged, in which the batteries are so maintained with respect to one another that there is no interference to prevent the convenient removal or placing of the particular battery; and in which the batteries may be serviced by charging, filling with water, etc., without removal from the rack, thereby limiting the demands upon the time and strength of the lamp-house attendant.

Another feature of the present invention is the provision of means for connecting an individual battery to a charging circuit, including devices cooperative with parts secured to the battery for effecting a disconnection within the battery assembly as an incident of removal of the battery from the charging assembly, so that the battery assembly is assured against the presence of exposed terminals at different potentials.

A detail of the invention is the provision of key means on a charging rack for interengagement with key means on a battery assembly and effective for actuating a switch comprised in the battery assembly during the operation of mechanically connecting the battery for charging, whereby electrical circuits are set up for the charging, and for producing an opening of this switch during the mechanical operation of separating the battery assembly from the charging assembly.

A further feature of the invention is the provision of a charging system for mine lamps which are comprised of a battery, a connecting cord and a head piece, the head piece being separable from the battery so that the battery may be connected for re-charging, and wherein the charging assembly includes a panel board with a plurality of sets of parts for permitting the re-charging of the individual batteries, each set of parts including a set of terminals and a support for the separated head piece, this support including means by which the electrical circuits for charging are not associated except when the head piece is in position on the support.

A feature of the invention is the provision of a charging assembly, in which standard parts can be employed in the assembly, so that the operations and cost to manufacture are greatly simplified and cheapened.

With these and other features as objects in view, illustrative forms of practice of the invention are shown in the accompanying drawings, in which:

Figure 1 is a perspective view of a charging apparatus with several battery assemblies therein;

Figure 2 is a perspective view of a portion of a battery box holder for receiving the individual battery boxes.

Figure 3 is a fragmentary view showing a portion of the charging panel proper.

Figure 4 is an upright sectional view through the same substantially on line 4—4 of Figure 3.

Figure 5 is a rear view of the corresponding fragment.

Figure 6 is a sectional view substantially on line 6—6 of Figure 3, showing a charging receptacle in section, on a larger scale.

Figure 7 is a front view of a charging receptacle.

Figure 8 is an end view of a terminal member at the end of a battery cable, in an enlarged scale.

Figure 9 is a side view of the same.

Figure 10 is a view showing the parts included within the cable terminal.

Figure 11 is a diagrammatic view showing the employment of a secondary switch with a battery assembly having a separable head piece.

Figure 12 is a fragmentary view showing a clip as employed on the support panel of Figure 1.

Figure 13 is a corresponding view showing the electrically insulated clip members employed with Figure 11.

In these drawings the charging assembly is shown as comprising the legs 10 for supporting end pieces 12, between which are positioned battery-supporting grids 13 for receiving a plurality of battery boxes. The end members 12 support the panel board P which is provided with sets each comprising an indicating meter 14 and a corresponding charging receptacle 15. Above the panel board P may be provided a support board S for receiving the head pieces H of mine lamps when these are separable from the batteries and cables. At one end of the charging rack is a control board 16 having the switch 17 for controlling the motor generator 18, together with the switches 19 for controlling the energization of buses as will be described in detail hereinafter. Meters 20 may be provided for indicating the current consumption and delivery of the motor generator 18 and the field rheostat 21 permits regulation of the charging potential delivered by this motor generator.

In the preferred form of construction, as indicated in Figure 2, the grids 13 are formed of upper and lower rails 25, 26, and have the opposed projections 27 on these rails. The spacing of these projections is such that a battery box may be slid between pairs of the projections and thus is supported against any considerable movement, its bottom resting upon the inwardly projecting ledge 28 connected to the corresponding bottom rail 26 and upon the upper portion of an angle bar 28a. It will be noted that these grids may be identical in shape and size, and are provided with the end pieces 29 through which bolts 30 may be inserted for connecting them to the end members 12, to a spacer block 13a, 13b or 29a or to another grid, so that assemblies of the desired size may be constructed. It has been found in practice that a desirable size of grid is one which provides individual spaces between the notches 27 for receiving eight batteries: and in actual construction, as shown in Figure 1, it has been preferred to provide it so that two rows of battery boxes at different level may be utilized, together with two rows of sets of structures on the panel P. In this illustrated form, the battery-supporting grids 13 are assembled so that they support the batteries in staggered relationship (Figure 1) and have such a distance between adjacent batteries that the connection cable of a battery in the front row may be passed between two batteries of the rear row. In order that the grids 13 may be of standard and uniform construction, this staggered relationship is obtained by employing spacer blocks 13a, 29a at the ends of the rows, being inserted at one end of one row and at the other end of the other row, and bolted to the end pieces 29 of the corresponding grid and to the end members 12 of the support. This arrangement also facilitates the removal of any battery from and its insertion into the rack without disturbance of any other battery. Likewise, the positioning of the front row of batteries at a lower level than the rear row permits easy inspection, and permits of the commodious disposition of the connecting cables between batteries of the rear row.

As shown in Figures 3, 4 and 5, the panel P has apertures for receiving the two rows of indicating devices 14 which are illustrated as normal electro-magnetic indicators of current intensity. The panel P likewise has apertures for receiving a corresponding number of receptacles 15, each receptacle being located adjacent the corresponding indicator 14 of its set. Behind the panel board P are the two bus-bars 35, 36 which are held apart by the insulating collars 37 through which pass the securing bolts 38, insulating members 39 being provided so that the front end of the bolts 38 will be "dead."

The conductive system comprises a jumper connection 40 which is soldered to the bus bar 35 and is attached to one part of a charging receptacle 15. Another part of this charging receptacle is connected by a jumper conductor 41 with one terminal of the meter 14, while the other terminal of the meter 14 is connected to a jumper 42 which has its other end soldered to the bus bar 36. A corresponding system of connections is provided for each other set of charging receptacle and corresponding meter.

As shown in Figures 6 and 7, a charging receptacle 15 may comprise the sleeve member 45 having an enlarged portion 46 at its rear end for receiving an insulating disk 47. The sleeve 45 has an L-slot 48 extending from its front face, and is stiffened and held against separation from the panel P by an external ring 49 which may be soldered in position. The rear end of the sleeve 45 is provided with a flange 50 upon which is seated a conductor strip forming the corresponding jumper connection 40, and a channel-like annular securing member 52 is then spun over the strip 40 and the flange 50 to hold the parts together and maintain the insulating disk 47 in position. It will be noted that the member 52 and the strip 40 are apertured to expose a major portion of the rear surface of the disk 47. This disk receives a central key part 53 which is cylindrical in its external shape and has a triangular cavity open at the front end. The rear end of the key part 53 is reduced in size and extends into the disk 47 and is riveted at its end to hold the key part against separation, the reduced section being square to conform to a similar hole in the disk 47 to prevent relative rotation. Further, the disk 47 has contact means 54 of which two are illustrated and are located (Figure 7) at a peripheral angle of 90 degrees with respect to one another. The jumper connection 41 is connected by solder to the key part 53 and to the contact means 54: it will be understood that only a single key part 53 is employed with the L-shaped slot 48, but that the insulating disk 47 is generally of the nature employed in the head lamp assembly of Patent No. 2,313,165, and is here illustrated as indicating the relationship of structures, and the capability of utilizing a standard part in a like position in the head lamp and in the charging device. It will be understood that the positions of the key part 53, of the L-slot 48 and of the contact means 54 are fixed with respect to one another and are so selected as to cooperate with the connector plug which forms a part of the battery assembly.

A connector plug for connection with the illustrative form of charging receptacle is shown in Figures 8, 9 and 10, corresponding to the showing in Patent No. 2,313,165.

As illustrated in Figure 1, each battery box B is provided with a cable or cord C having a connector member at its end for engagement in the charging receptacle during charging and for engagement in a head piece H during the employment of the mine lamp. At the end of the cord which is to be fitted to the head lamp or to the charging receptacle is provided a ferrule structure including a metal sleeve 81 which is connected to a conductor 82 (Figure 10) in the cable C. This sleeve 81 has a pin-like projection 84 for engagement in the L-shaped slot 48 of the sleeve 45 and thereby determining the relative orientation of the parts of the separable connection.

The enlarged part of the sleeve receives an inner sleeve 85, which is of insulating material and has diametrically opposed external grooves 86 for locating engagement by the tongues 87 on the sleeve, whereby to determine the desired relative angular position of these parts, and also to hold the insulating sleeve in assembled position. The insulating sleeve 85 has a pair of grooves 89 at its inner surface, in predetermined angular position relative to the grooves 86.

A cup-shaped member 90 is fitted for a guided sliding movement in the insulating sleeve 85, and is provided with outwardly projecting portions 91 which are received in the grooves 89 for locating this member 90 and limiting its relatively outward movement. The member 90 has an inwardly extending flange 92 and has guiding apertures 93 therein, two being provided in the illustrated form; and also has a central aperture 93a which is of sufficient size to loosely pass the key part 53.

A sleeve plunger 94 of conductive metal has a flange 95 provided with the projecting pins 96, which are two in number in this preferred form and which can slide in the apertures 93. The sleeve 94 loosely receives the key part 53. A coil spring 97 bears against the lower surface of the flange 95 and presses the plunger into contact with the flange 92, with its pins 96 fully extended through the apertures 93 so that they provide contact points. The thrust of the opposite end of the spring 97 is received by a switch plate 98 which is formed at its upper face with a key part 99, which preferably is of triangular section and fits closely in the triangular passage of the key part 53. The switch plate 98 is rotatable within the insulating sleeve 85, and is illustrated as provided on its lower face with four contact points 100 which are spaced apart at 90 degrees and have a uniform radius from the axis.

An insulating disk 101 rests against the shoulder 83 at the bottom of the enlarged portion of the sleeve 81, and supports a conductive metal disk 102 at its upper surface. This disk 102 is cut away so that the four insulating projections 103 of the insulating disk 101 may extend therethrough, each of these projections preferably having a central cavity for receiving a corresponding contact point 100 and affording resistance against accidental displacement thereof. The disks 101, 102 also have a central aperture 104 through which extends the second conductor 105 of the cable C, this conductor end 105 being soldered to the disk 102. The disk 101 has a notch 105a at its edge for engagement with a locating projection 106 of the sleeve 81. A rubber protective jacket R surrounds the reduced portion of the sleeve 81 (Figure 9).

The support board S (Figure 1) may be of wood or like insulating material, and receives the metal straps 61 which are bent outwardly from point to point to provide clips 60 which receive the usual cap loops of the head piece H.

With the illustrative form just described, when the miner comes off shift, he removes the battery box and the head piece from his person, and twists the terminal at the end of the cable C. As pointed out in Patent No. 2,313,165, this results in a displacement of the switch means including the switch plate 98 within the cable terminal structure, and of the pins 96 with respect to the corresponding contactors in the head piece, so that an electrical disconnection occurs simultaneously with a mechanical movement of the parts to a position at which the plug terminal on the cable C may be separated from the head piece H. Upon separation of the parts, the plug can immediately be introduced into the sleeve 45 of the proper charging receptacle 15. The battery box B is received in and supported by the grid structures (Figure 2), and the cable C can be pushed out of the way into the space between the lower edge of the panel P and the rear of the group of batteries. The head piece H may then be engaged with the proper clip 60.

The operation of inserting the plug on the cable C into the receptacle 15 can only be accomplished when the pin 84 engages and can slide in the L-slot 48. In this position, the key part 99 in the plug can enter the key part 53 in the receptacle, providing that no derangement of the structures has been attempted. When the plug has been forced into the sleeve 45, the pins 96 engage the disk 47 at insulated portions thereof. Upon rotating the plug about its axis, the pin 84 can move into the offset portion of the L-slot 48. Therewith, the pins 96 are rotated so that one of them engages a contact means 54. Simultaneously the inter-engagement of the key parts 53, 99, has held the switch plate 98 against movement, so that the disk 101 turns relative to it and a conductive portion of the metal disk 102 is presented to each of the contact points 100, thus closing the switch of the battery system.

Charging can now occur, and current flows from the bus bar 35 by strip 40, the sleeve 45 of the receptacle, sleeve 81 of the plug, conductor 82 of cable C, through the battery, and returning by conductor 105 to metal disk 102, by contact points 100, switch plate 98, spring 97, plunger 94, pin 96, contact 54, conductor 41, through the corresponding indicator 14, conductor 42, to the bus bar 36. Current flows, and the fact of flow can be observed by the movement of the hand of the indicator 14, so that the minor can see that his battery is being charged.

If the key part 99 of the plug terminal has been shifted, for example, by an attempt of the miner to obtain a potential difference from his battery for shot firing, then the interengagement of this key part 99 with the characteristic tool provided by the key receiving part 53 of the receptacle will not be feasible, and no charging can be accomplished until the miner has had his battery assembly re-adjusted. Thus, there is a definite control upon attempts by the miners to employ their lamps in non-standard and prohibited manners. Further, it will be noted that even with the use of a regular triangle for the shape of the key parts, only three possible positions are available in which the interengagement can occur, and in two of these positions the contacts 96 and 54 cannot be brought into proper charging relationship, having given appropriate arcuate dimensions of these contactors. Thus, the miner is further discouraged from such dangerous employment of his battery assembly.

While a miner is off shift, the attendant can perform the usual servicing operations, and can observe the charging of the various batteries. It will be noted that the sets of receptacles 15 and the indicators 14 are so positioned that the contiguity of parts essentially serves to prevent error by the miner: while the position of the corresponding clip 60 above the charging panel P permits the miner to utilize the proper head lamp support corresponding to this set. Obviously, other identifying means may be employed such as the use of numerals 15 to identify the particular sets.

With the type of battery illustrated, the attendant is able to remove the top plugs and supply water as required, without removing the battery from its proper receptacle in the grid, and without interrupting the charging. Hence, the supervision of the charging is facilitated, and the attendant need not remove the battery to a work bench for the watering operation, and the watering can be accomplished by the use of normal tools.

When the miner is about to go on shift, he can remove the head lamp H from its support, and withdraw the plug terminal on cord C by a natural twisting and pulling movement, and then replace the plug terminal in the head lamp and secure it there by a similar pushing and twisting operation. Upon twisting the plug incident to mechanically disconnecting and removing it from the charging receptacle, the charging circuit is broken between the contact pin 96 and the contact means 54, and also is broken within the plug terminal by the relative rotation of the switch plate 98 with respect to the insulating disk 101 and the metal disk 102. Hence, the parts of the plug member are not at different potentials, and the battery is "safe" against undesirable employment in the mine, as pointed out in the co-pending application. An essential feature of the present device, therefore, is the provision of key parts and interengaging mechanical devices on the charging panel for cooperation with parts of the battery assembly so that the battery assembly is devoid of exposed parts at different potential while in service, and so that the manipulations of presenting the battery assembly in the charging apparatus comprise manipulation of switch means in the battery system for producing a charging and therewith also an engagement of mechanical devices for preventing separation of the parts while they occupy relative positions in which such potential differences in the plug member exist.

In the form of construction shown in Figure 11, the indicators 14 and charging receptacles 15 are conventionally illustrated as in Figure 3, and the buses 35, 36 are similarly positioned, with jumpers 41 for connecting the receptacles and indicators in series. In this form, however, the jumpers 42 are divided into two portions 42a, 42b, and the supporting clips for the cap loops of the head pieces are formed of spaced and electrically insulated members 60a on the support board S, these members being connected in series with the corresponding indicator 14 and receptacle 15 by the conductor portions 42a, 42b. The miner's manipulations for effecting a charging of his battery are essentially the same as before, except that with this form of invention, the metal cap loop of the mine lamp is slipped between the corresponding member 60a so as to bridge the latter. With this form, therefore, a further switch means is provided in the charging circuit so that the charging is only effective and continuous while the head piece is in proper position on the supporting panel S of the charging rack: and thus the miner knows, from observation of the charging indicator, that he must leave the mine lamp head piece in the lamp house before charging can be accomplished.

While an illustrative form of practicing the invention has been shown, with a modification thereof, it will be understood that the invention is not limited solely to this form, but that it may be practiced in many ways within the scope of the appended claims.

We claim:

1. A charging rack for mine lamp batteries and like devices including a battery in an assembly having an attached cable and an end member including charging terminals, said assembly also including a rotatable switch for disconnecting at least one of said charging terminals from the battery cell and a first key part operatively connected to said switch, comprising a structure including charging terminals cooperative with the charging terminals on said end member, a second key part fixed on said structure, said key parts being constructed and arranged for mechanical engagement upon a sliding movement when said end member is in a predetermined initial position relative to said first key part with the switch open, and means effective upon rotation of the end member relative to the structure for preventing separation of the end member from the structure until the end member has been returned to said predetermined initial position, the key parts being effective upon such relative rotation to effect closing of the switch and during the return movement to effect reopening of the switch.

2. A charging rack for mine lamp batteries and like devices including a battery in an assembly having an attached cable and an end member including charging terminals, said assembly also including a rotatable switch for disconnecting at least one of said charging terminals from the battery cell and a first key part operatively connected to said switch, comprising a structure including charging terminals cooperative with the charging terminals on said end member, a second key part fixed on said structure, said key parts being constructed and arranged for mechanical engagement upon a sliding movement when said end member is in a predetermined initial position relative to said first key part with the switch open, and means effective upon rotation of the end member relative to the structure for preventing separation of the end member from the structure until the end member has been returned to said predetermined initial position, the key parts being effective upon such relative rotation to effect closing of the switch and during the return movement to effect reopening of the switch, one charging terminal of the end member being angularly spaced from the corresponding terminal during the sliding movement and said relative rotation being effective for bringing the same into electrical contact.

3. A charging rack for mine lamp batteries and like devices including a battery in an assembly having an attached cable and an end member including charging terminals, said assembly also including a rotatable switch for disconnecting at least one of said charging terminals from the battery cell and a first key part operatively connected to said switch, said switch and first key part being normally presented in a predetermined initial position relative to other parts of the end member preparatory to charging, comprising a structure including charging terminals cooperative with the charging terminals on said end member, a second key part fixed to said structure, said key parts being constructed and arranged for mechanical engagement upon a sliding movement when said first key part is in said initial position and thereupon becoming cooperatively effective upon rotation of the end member for relatively detaining parts of said switch during movement of other parts of the end member and thereby effecting closure and opening of said switch, and means for holding the said end member against rotation during the sliding movements of engagement and disengagement and for engaging and holding the end member against separation from the structure when the end member is in its relatively rotated position of switch closure, at least one said charging terminal on the structure being electrically disconnected from the corresponding terminal on the end member at the end of said sliding engagement so that the same are electrically engaged only upon said switch-closing rotative movement, said holding means being effective for compelling opening of said switch and restoration of the key part connected thereto to the predetermined initial position before the end member can be separated from the structure.

4. A charging rack for mine lamp batteries and like devices including a battery in an assembly having an attached cable and an end member including charging terminals, said assembly also including a switch for disconnecting at least one of said charging terminals from the battery cell and having a relatively rotatable switch element and cooperative switch elements fixed to said end member, and a first key part operatively connected to said switch, said switch and first key part being normally presented in a predetermined initial position relative to other parts of the end member prior to charging but being capable of occupying other positions following tampering therewith, comprising a structure including charging terminals cooperative with the charging terminals on said end member, a second key part fixed to said structure; said key parts, end member and structure including portions constructed and arranged for mechanical engagement upon an axial sliding movement when said first key part is in any of a restricted number of positions and thereupon becoming cooperatively effective upon rotation of the end member for relatively detaining the relatively rotatable switch element during movement of the said cooperative contacts with the end member and thereby effecting movement of said switch, said end member and structure having their portions arranged with respect to said key parts and the fixed switch elements for preventing switch closure unless the said first key part has been presented in said predetermined initial position; a charging indicator connected to the charging terminals on the structure for indicating the conditions of switch closure and non-closure whereby to reveal the fact of tampering; and pin and bayonet-slot means on said end member and structures for holding the said end member against separation from the structure when the end member is in its relatively rotated position, at least one said charging terminal on the structure being angularly spaced from the corresponding terminal on the end member during said sliding movement so that the same are electrically engaged only upon said switch-closing rotative movement, said holding means being effective for compelling opening of said switch and restoration of the key part connected thereto to the predetermined initial position before the end member can be separated from the structure.

5. A charging rack for mine lamp batteries and like devices including a battery in an assembly having an attached cable and an end member including charging terminals comprising a conducting sleeve and a contact insulated from and located radially within the sleeve, said assembly also including a rotatable switch for disconnecting said contact from the battery cell and a first key part operatively connected to said switch, said switch and first key part being normally presented in a predetermined initial position relative to other parts of the end member prior to charging, comprising a structure including charging terminals cooperative with the charging terminals on said end member and including a socket for closely receiving said sleeve and a fixed contact in said socket for cooperatively engaging the contact on said end member, a second key part fixed to said structure, said key parts being constructed and arranged for mechanical engagement upon a sliding movement when said first key part is in said initial position and thereupon becoming cooperatively effective upon rotation of the end member for relatively detaining parts of said switch during movement of other parts thereof with the end member and thereby effecting closure and opening of said switch, said sleeve and socket being effective for mechanically enclosing the said contacts during charging, and pin and bayonet-slot means on said sleeve and socket for holding the said end member against separation from the structure when the end member is in its relatively rotated position of switch closure, at least one said charging terminal on the structure being angularly spaced from the corresponding terminal on the end member during said sliding movement so that the same are electrically engaged only upon said switch-closing rotative movement, said holding means being effective for compelling opening of said switch and restoration of the key part connected thereto to the predetermined initial position before the end member can be separated from the structure.

6. A charging rack for mine lamp batteries and like devices including a battery in an assembly having an attached cable and an end member including charging terminals, said assembly also including a rotatable switch for disconnecting at least one of said charging terminals from the battery cell and a first key part operatively connected to said switch, comprising a structure including charging terminals cooperative with the charging terminals on said end member, a second key part fixed on said structure, said key parts having mating and interengaging portions of equilateral triangular form, said switch including means by which electrical circuit can be closed at any one of four equally spaced angular positions and the circuit broken at positions intervening said closure positions, said key parts being constructed and arranged for mechanical engagement upon a sliding movement when said end member is in a predetermined initial position relative to said first key part with the switch open, a pin and bayonet-slot means on the end member and structure effective to limit the relative rotation of the end member to an angle corresponding to the switch movement from open to closed position and effective upon rotation of the end member relative to the structure for preventing separation of the end member from the structure until the end member has been returned to said predetermined initial position, the key parts being effective upon such relative rotation to effect closing of the switch and during the return movement to effect reopening of the switch, one charging terminal of the end member being angularly spaced from the corresponding terminal during the sliding movement and said relative rotation being effective for bringing the same into electrical contact.

7. A charging rack for mine lamps and like devices of the type comprising assemblies of batteries and head lamps and connecting cables including separable connectors between a battery-attached part and a head lamp part, with switches which are located between the battery cells and the battery-attached part of the separable connector and are moved to open position upon separating the connectors, said connectors including each a first key part connected for actuating the switch, comprising a receptacle for receiving the battery-attached part of the separable connector, said receptacle including charging contacts and a second key part cooperative with the first key part to effect closing of the switch during the engaging of the battery-attached part in the receptacle, and a supporting device for receiving the head lamp part, a circuit breaking means associated with said support and closable upon the presence of a head lamp in said support, supply mains, and conductive means effective for connecting the receptacle and the circuit breaking means in series across the supply mains, whereby it is necessary to engage the battery-attached part in a receptacle and to place the head lamp part in the corresponding support for producing a charging connection to the battery.

GEO. C. NELMS.
EARL J. COGGESHALL.
EARL A. BERRY.
WILLIAM K. WILBUR.